(12) United States Patent  (10) Patent No.: US 8,780,041 B2
Yano  (45) Date of Patent: Jul. 15, 2014

(54) APPARATUS FOR DISPLAYING INFORMATION CORRESPONDING TO CONNECTION OF CONTROLLER AND METHOD THEREOF

(75) Inventor: Takehide Yano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 253 days.

(21) Appl. No.: 13/113,711

(22) Filed: May 23, 2011

(65) Prior Publication Data

US 2012/0105320 A1  May 3, 2012

(30) Foreign Application Priority Data

Oct. 29, 2010 (JP) ................................ 2010-244300

(51) Int. Cl.
  *G06F 3/033* (2013.01)
  *G09G 5/08* (2006.01)
(52) U.S. Cl.
  USPC .......................................................... 345/157
(58) Field of Classification Search
  USPC .................. 345/156–167; 715/754, 856–859; 348/734
  See application file for complete search history.

(56) References Cited

U.S. PATENT DOCUMENTS

| 6,281,881 B1 * | 8/2001 | Siddiqui et al. ............... 345/164 |
| 2007/0094618 A1 * | 4/2007 | Yoshida ........................ 715/856 |

FOREIGN PATENT DOCUMENTS

| JP | 05-103376 | 4/1993 |
| JP | H 09293042 | 11/1997 |
| JP | 2000-039941 | 2/2000 |
| JP | 2007028079 | 2/2001 |
| JP | 2003-078779 | 3/2003 |
| JP | 2007-299033 | 11/2007 |
| JP | 2008-216102 | 9/2008 |

OTHER PUBLICATIONS

Japanese Patent Application No. 2010-244300, First Office Action, mailed Aug. 21, 2012, (with English Translation).
Japanese Patent Application No. 2012-240197, First Office Action, mailed Nov. 12, 2013, (with English Translation).

* cited by examiner

*Primary Examiner* — Joseph Feild
*Assistant Examiner* — Gustavo Polo
(74) *Attorney, Agent, or Firm* — Blakely, Sokoloff, Taylor & Zafman LLP

(57) ABSTRACT

According to one embodiment, an image signal processing apparatus includes a connecting module, a controller and a display controller. The connecting module is configured to be capable of being connected with a pointer operating device. The controller is configured to be controlled in a state of performing pointer operation with a remote control while being in a non-connected state of a pointer operating device to the connecting module and to be controlled in a state of performing pointer operation with the pointer operating device in a connected state of the pointer operating device to the connecting module. The display controller is configured to display a image which indicates the pointer operating device is connected to the connecting module on a screen during a time period of the connection of the pointer operating device.

15 Claims, 7 Drawing Sheets

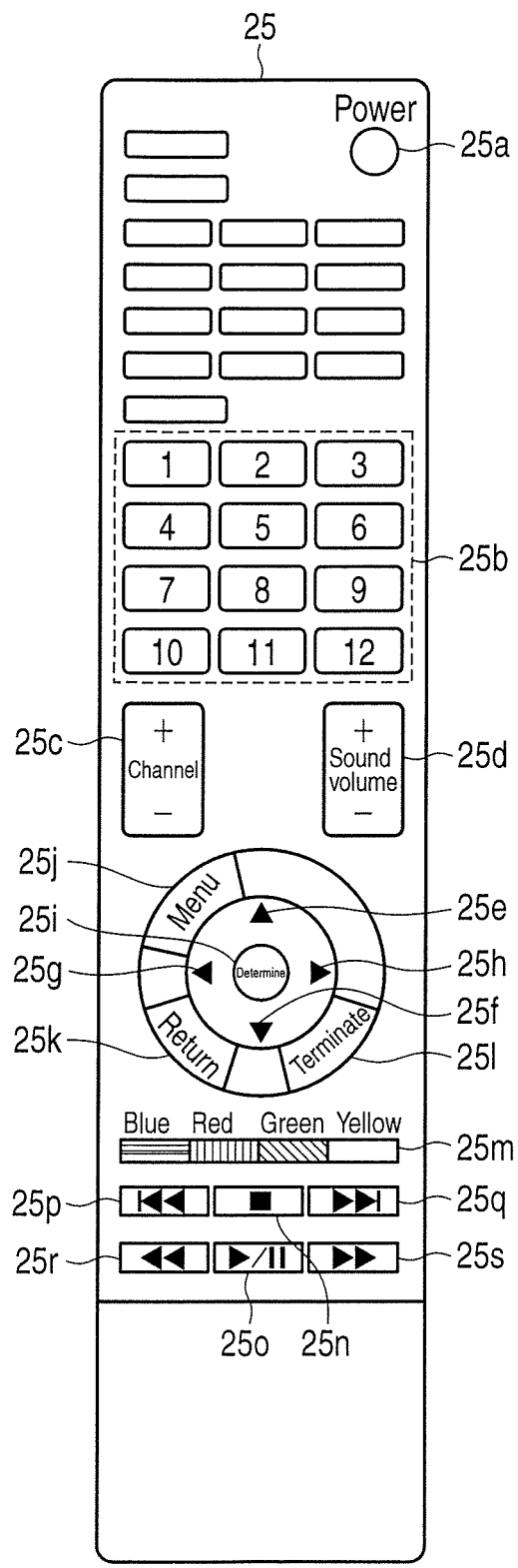
F I G. 2

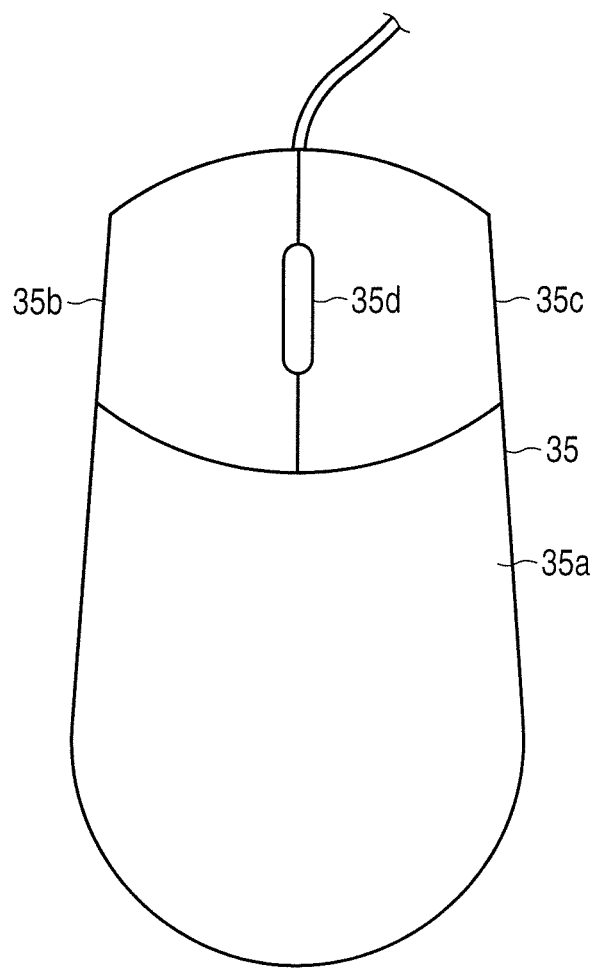
F I G. 3

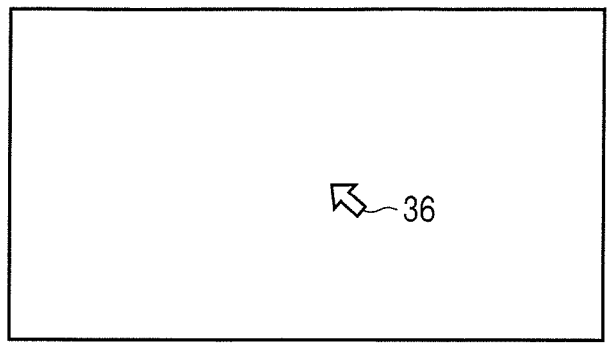
F I G. 4 A
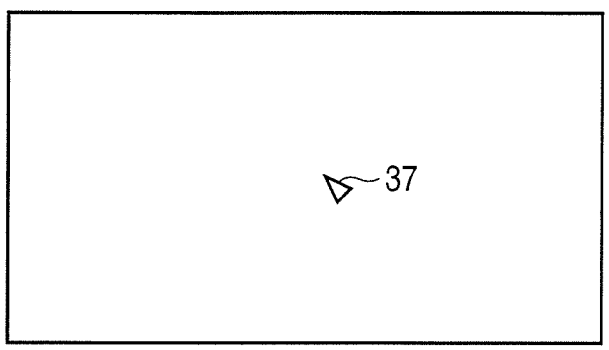
F I G. 4 B
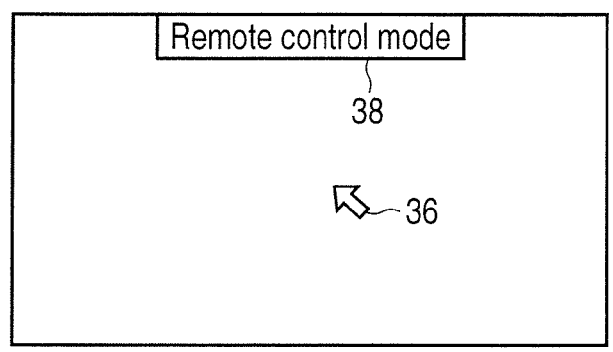
F I G. 5 A
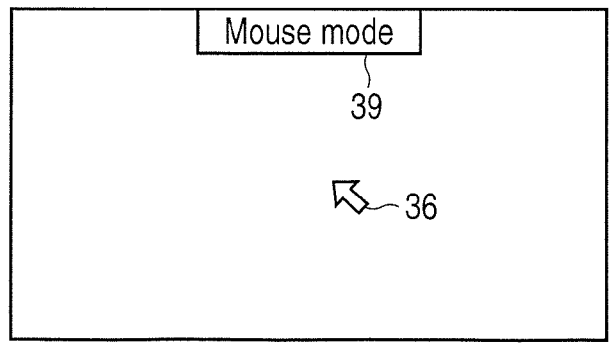
F I G. 5 B

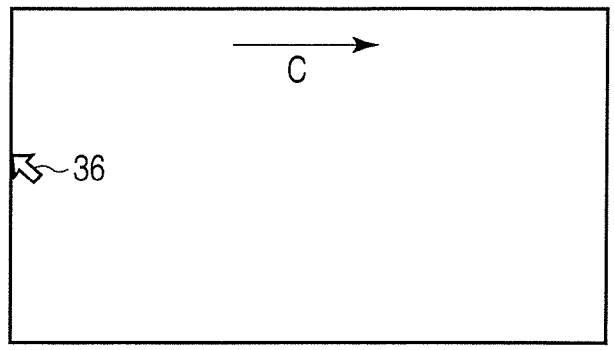
FIG. 8A
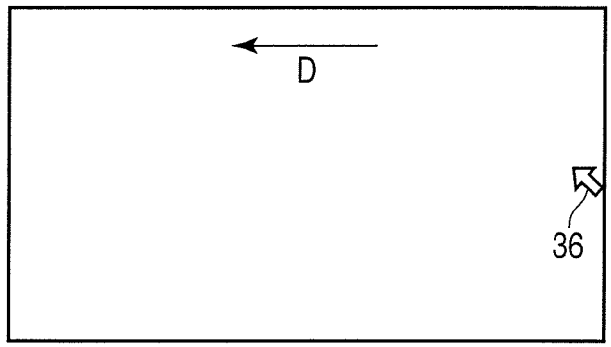
FIG. 8B
| Setting function | Mouse | Touch pad |
|---|---|---|
| Automatic scrolling in screen vertical direction | Invalid | Valid |
| Automatic scrolling in screen horizontal direction | Valid | Valid |
| Character inputting screen | Soft keyboard | Soft keyboard |
| | | |
FIG. 9

APPARATUS FOR DISPLAYING INFORMATION CORRESPONDING TO CONNECTION OF CONTROLLER AND METHOD THEREOF

CROSS-REFERENCE TO RELATED APPLICATIONS

This application is based upon and claims the benefit of priority from Japanese Patent Application No. 2010-244300, filed Oct. 29, 2010; the entire contents of which are incorporated herein by reference.

FIELD

Embodiments described herein relate generally to an image signal processing apparatus to operate a pointer displayed on a screen and a method of controlling the same.

BACKGROUND

As is well known, an image signal processing apparatus such as a digital television broadcast receiver and an optical disk recording/reproducing apparatus includes a function to perform various types of state setting on the apparatus itself, input of predetermined characters and the like by displaying plural options on a screen and having a desired option selected thereamong by a user.

At present in this case, a determine key is to be operated after a pointer displayed on the screen of the image signal processing apparatus is moved to the desired option as a user selectively operates respective upward, downward, leftward and rightward moving keys arranged at a remote control. Accordingly, operability is unsatisfactory for a user and pointer operation is complicated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an external view illustrating an example of a remote control used for the digital television broadcast receiver according to the embodiment;

FIG. 3 is an external view illustrating an example of a mouse to be connected to the digital television broadcast receiver according to the embodiment;

FIGS. 4A and 4B are explanatory views respectively of an example of a pointer to be displayed on a screen of the digital television broadcast receiver according to the embodiment;

FIGS. 5A and 5B are explanatory views respectively of an example of a message to be displayed on a screen of the digital television broadcast receiver according to the embodiment;

FIGS. 8A and 8B are explanatory views respectively of an example of an automatic scrolling function in the horizontal direction of a screen performed by the digital television broadcast receiver according to the embodiment;

FIG. 9 is an explanatory view of an example of a table organizing setting information for each function corresponding to a type of a pointer operating device to be connected to the digital television broadcast receiver according to the embodiment.

DETAILED DESCRIPTION

Various embodiments will be described hereinafter with reference to the accompanying drawings. In general, according to one embodiment, an image signal processing apparatus is controlled in a state corresponding to operational information while receiving the operational information output from a remote control, and comprises a connecting module, a controller and a display controller. The connecting module is configured to be capable of being connected with a pointer operating device. The controller is configured to be controlled in a state of performing pointer operation with the remote control while being in a non-connected state of a pointer operating device to the connecting module and to be controlled in a state of performing pointer operation with the pointer operating device in a connected state of the pointer operating device to the connecting module. The display controller is configured to display a image which indicates the pointer operating device is connected to the connecting module on a screen during a time period of the connection of the pointer operating device.

Figure 1:
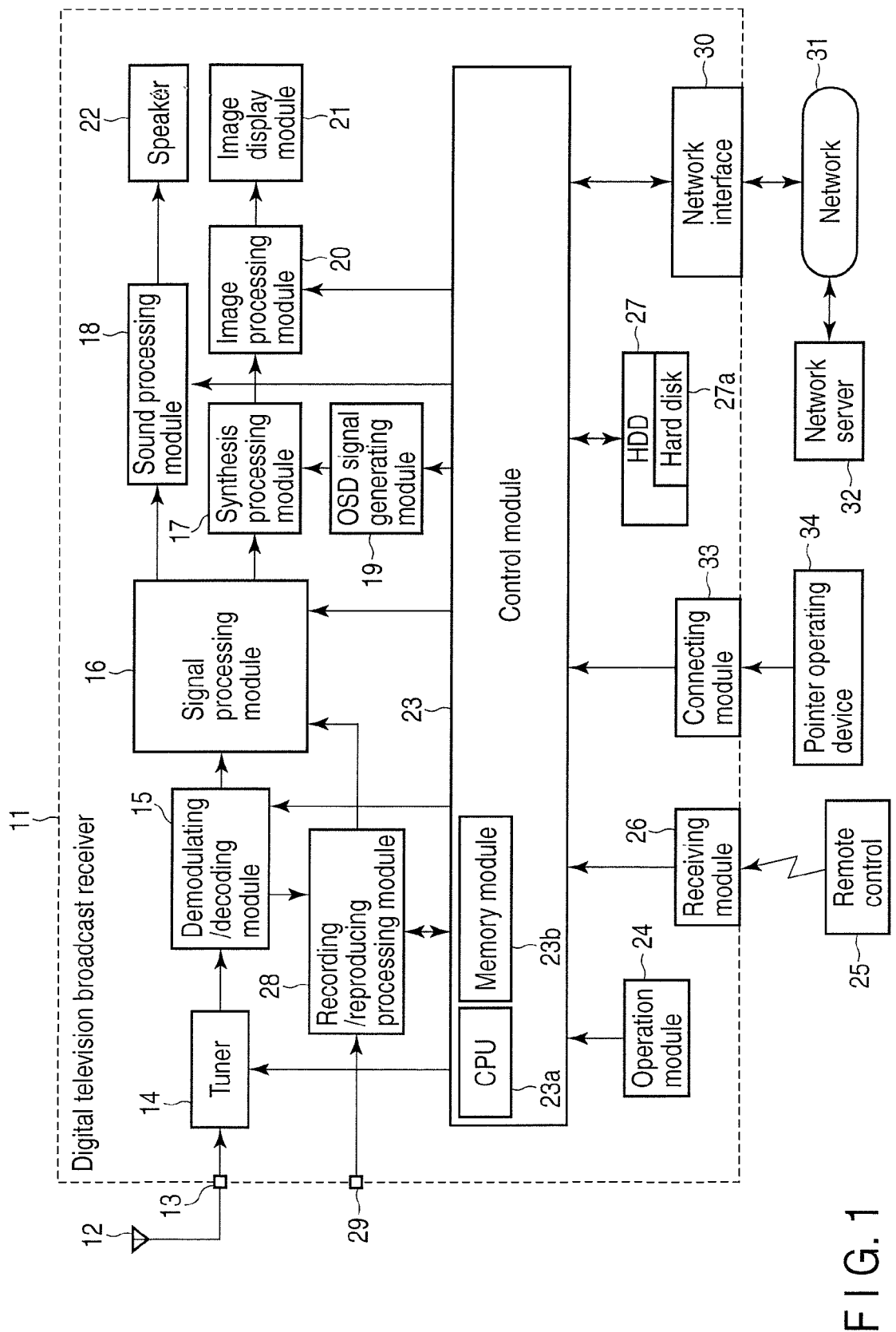
FIG. 1 is a block configuration diagram schematically illustrating an example of a signal processing system of a digital television broadcast receiver according to an embodiment.

FIG. 1 schematically illustrates a signal processing system of a digital television broadcast receiver 11 as an example of an image signal processing apparatus to be described in the present embodiment. More specifically, a digital television broadcast signal received by an antenna 12 is supplied to a tuner 14 via an input terminal 13, so that the broadcast signal of a desired channel is tuned. The broadcast signal tuned by the tuner 14 is output to a signal processing module 16 after being restored to a digital image signal, a digital sound signal and the like as being supplied to a demodulating/decoding module 15.

The signal processing module 16 performs a predetermined digital signal process respectively on the digital image signal and sound signal supplied from the demodulating/decoding module 15. Then, the signal processing module 16 outputs the digital image signal to a synthesis processing module 17 and the digital sound signal to a sound processing module 18.

Here, the synthesis processing module 17 outputs a superimposed signal of the digital image signal supplied from the signal processing module 16 with an OSD signal generated at an on screen display (OSD) signal generating module 19. Then, the digital image signal output from the synthesis processing module 17 is supplied to an image processing module 20.

The image processing module 20 converts the input digital image signal into a format capable of being displayed at a subsequent plane type image display module 21 including a crystal-liquid display panel and the like, for example. Then, the display image signal output from the image processing module 20 is supplied to the image display module 21 for displaying an image.

Further, the sound processing module 18 converts the input digital sound signal into an analog sound signal of a format which can be reproduced at a subsequent speaker 22. Then, the analog sound signal output from the sound processing module 18 is supplied to the speaker 22 for sound reproduction.

Here, in the digital television broadcast receiver 11, all operation thereof including the various types of receiving operation described above is comprehensively controlled by a control module 23. The control module 23 incorporating a central processing unit (CPU) 23a receives operational information from an operation module 24 arranged at a main body of the digital television broadcast receiver 11 or receives operational information transmitted from a remote control 25 and received by a receiving module 26, and then, controls each module to reflect the operational information.

In this case, the control module 23 utilizes a memory module 23b. The memory module 23b mainly includes a read only memory (ROM) which stores a control program to be executed by the CPU 23a, a random access memory (RAM) which provides a work area to the CPU 23a, and a nonvolatile memory which stores various types of setting information, control information and the like.

Further, a hard disk drive (HDD) 27 is connected to the control module 23. Based on operation of the operation module 24, the remote control 25 and the like by a user, the control module 23 can control the digital image signal and sound signal obtained from the demodulating/decoding module 15 to be recorded in a hard disk 27a as being supplied to the HDD 27 after being encrypted by a recording/reproducing processing module 28 and converted into a predetermined recording format.

Further, based on operation of the operation module 24, the remote control 25 and the like by a user, the control module 23 can control the digital image signal and sound signal to be used for the above image display and sound reproduction subsequently by being supplied to the signal processing module 16 after being read from the hard disk 27a at the HDD 27 and decoded by the recording/reproducing processing module 28.

Further, an input terminal 29 is connected to the digital television broadcast receiver 11. The input terminal 29 is for directly inputting the digital image signal and sound signal from the outside of the digital television broadcast receiver 11. Based on the control of the control module 23 corresponding to the operation of the operation module 24, the remote control 25 and the like by a user, the digital image signal and sound signal input via the input terminal 29 are used for the above image display and sound reproduction by being supplied to the signal processing module 16 via the recording/reproducing processing module 28.

Further, based on the control of the control module 23 corresponding to the operation of the operation module 24, the remote control 25 and the like by a user, the digital image signal and sound signal input via the input terminal 29 are used for recording and reproduction with respect to the hard disk 27a at the HDD 27 via the recording/reproducing processing module 28.

Further, the control module 23 is connected to an external network 31 via a network interface 30. Accordingly, based on operation of the operation module 24, the remote control 25 and the like by a user, the control module 23 can utilize various services available at the network server 32 on the network 31 by accessing the network server 32.

Further, the control module 23 is configured to be detachably connected with a pointer operating device 34 via the connecting module 33 which conforms to a universal serial bus (UBS) connection standard or the like, for example. Further, the connecting module 33 continuously detects presence or absence of the connection of the pointer operating device 34 and outputs a signal indicating a detection result thereof to the control module 23. Accordingly, the control module 23 is capable of discriminating between presence and absence of the connection of the pointer operating device 34.

Here, the pointer operating device 34 collectively denotes an operating device suitable for a so-called pointer operation such as moving a pointer displayed on a screen and performing operation for indication of intention to determine at the moved position and the like as being represented by a mouse, a touch pad and the like, for example.

Further, the control module 23 determines whether or not nature of current operation (e.g., nature displayed on a screen of the image display module 21) requires display of a pointer, as described later in detail. For example, it is determined that the pointer display is unnecessary when an image of a television broadcast program is displayed and that the pointer display is necessary when a browser screen provided by the network server 32 is displayed.

Then, when it is determined that the pointer display is necessary, the control module 23 causes the OSD signal generating module 19 to generate an OSD signal for displaying a pointer. The OSD signal generated from the OSD signal generating module 19 is displayed as the pointer by the image display module 21 via the image processing module 20 after being superimposed by the synthesis processing module 17 to the digital image signal output from the signal processing module 16, as described above.

As described later in detail, in this case, the control module 23 controls operation on the displayed pointer with the remote control 25 in a state that the pointer operating device 34 is not connected to the connecting module 33. Then, when the pointer operating device 34 is connected to the connecting module 33, it is automatically switched to perform operation on the displayed pointer with the pointer operating device 34 instead of the remote control 25 by the control module 23.

FIG. 2 illustrates an external appearance of the remote control 25. The remote control 25 is mainly provided with a power key 25a, numeral keys 25b, a channel up and down key 25c, a sound volume key 25d, an upward moving key 25e, a downward moving key 25f, a leftward moving key 25g, a rightward moving key 25h, a determine key 25i, a menu key 25j, a return key 25k, a terminate key 25l, four colors (blue, red, green and yellow) of color keys 25m, and the like.

The remote control 25 is further provided with a reproduction stop key 25n, a reproduce/pause key 25o, a backward skip key 25p, a forward skip key 25q, a quick back key 25r, a quick forward key 25s, and the like.

That is, reproduction, stop and pause can be performed on the HDD 27 by operating the reproduction stop key 25n and the reproducing/pausing key 25o of the remote control 25.

Further, so-called backward skip and forward skip to skip data such as the image and sound read from the hard disk 27a at the HDD 27 backward or forward with respect to the reproducing direction by a certain amount can be performed by operating the backward skip key 25p and the forward skip key 25q of the remote control 25.

Further, so-called quick back reproduction and quick forward reproduction to continuously and rapidly reproduce the data such as the image and sound read from the hard disk 27a at the HDD 27 backward or forward with respect to the reproducing direction can be performed by operating the quick back key 25r, the quick forward key 25s and the like of the remote control 25.

FIG. 3 illustrates an external appearance of a mouse 35 as an example of the pointer operating device 34. As is already well known, the mouse 35 is constituted with a holding portion 35a as a main body, a left click key 35b and a right click key 35c which are arranged in parallel at a distal end portion of the holding portion 35a, and a dial key 35d which is loosely and rotatably inserted between both of the click keys 35b, 35c.

Here, when it is required to display a pointer in a state that the pointer operating device 34 is not connected to the connecting module 33, the control module 23 causes the screen of the image display module 21 to display a pointer 36 having an arrow-like shape, as illustrated in FIG. 4A. This is realized by the control module 23 to cause the OSD signal generating module 19 to generate an OSD signal for displaying the pointer 36 having the arrow-like shape as illustrated in FIG. 4A.

Then, when the pointer operating device 34 is not connected to the connecting module 33, the control module 23 is controlled to be in a state of performing operation on the pointer 36 with the remote control 25. Specifically, the control module 23 is controlled to be in a state of performing operation on the pointer 36 as performing movement of the pointer 36 and indication of intention of determination and the like by selectively operating the upward, downward, leftward and rightward moving keys 25e, 25f, 25g, 25h and the determine key 25i of the remote control 25.

On the other hand, when the pointer operating device 34 is connected to the connecting module 33, the control module 23 causes the screen of the image display module 21 to display a pointer 37 having a triangular shape during a time period of the connection, as illustrated in FIG. 4B. This is realized by the control module 23 causing the OSD signal generating module 19 to generate an OSD signal for displaying the pointer 37 having the triangular shape as illustrated in FIG. 4B.

Then, in the state that the pointer operating device 34 is connected to the connecting module 33, the control module 23 is automatically switched into a state of performing operation on the pointer 37 with the pointer operating device 34 instead of the remote control 25. Specifically, it is automatically switched into a state of performing operation on the pointer 37 as movement of the pointer 37 and indication of intention such as determination by moving the mouse 35 and operating the left click key 35b when the pointer operating device 34 is the mouse 35.

Here, in the state that the pointer operating device 34 is connected as described above, the control module 23 performs control so that operation on the pointer 37 is not performed even when the remote control 25 is operated, that is, so that operation on the pointer 37 is performed only with the pointer operating device 34.

Further, when the pointer operating device 34 is detached from the connecting module 33, the control module 23 is automatically switched into the pointer operating state with the remote control 25 once again while causing the screen of the image display module 21 to display the pointer 36 having the arrow-like shape as illustrated in FIG. 4A.

According to the above embodiment, first, the pointer operating device 34 such as the mouse 35, for example, is capable of being connected. Then, when the pointer operating device 34 is connected, it is automatically switched into the pointer operating state with the pointer operating device 34 from the pointer operating state with the remote control 25. Accordingly, it becomes possible for a user to easily perform pointer operation by utilizing the pointer operating device 34, so that operability of the pointer operation on a screen can be remarkably improved.

Further, the shape of the pointer 37 which is displayed while the pointer operating device 34 is connected is varied from the shape of the pointer 36 which is displayed while the pointer operating device 34 is not connected. That is, the fact of having been switched into the pointer operating state with the pointer operating device 34 is indicated to a user by the shape of the pointer 37 during the time period thereof.

Accordingly, it becomes possible for a user to easily ascertain the fact of having been switched into the pointer operating state with the pointer operating device 34 by viewing the shape of the displayed pointer 37. Therefore, operation for a user becomes convenient and sufficiently applicable for actual use.

In the above embodiment, the shape of the displayed pointer 37 or 36 is varied in accordance with whether the pointer operating device 34 is connected. Here, it is also possible to vary color of the displayed pointer and to vary both of color and shape, for example.

Next, another example indicating whether the pointer operating device 34 is connected will be described. That is, in a state that a pointer is required to be displayed while being in a non-connected state of the pointer operating device 34, the control module 23 causes the screen of the image display module 21 to display a message 38 of "remote control mode" along with the pointer 36 indicating the pointer operating state with the remote control 25, as illustrated in FIG. 5A.

Then, when the pointer operating device 34 is connected to the connecting module 33, the control module 23 causes the screen of the image display module 21 to display a message 39 of "mouse mode" along with the pointer 36 indicating the pointer operating state with the pointer operating device 34, as illustrated in FIG. 5B.

Here, when the pointer operating device 34 is detached from the connecting module 33, the control module 23 is to be automatically switched into the pointer operating state with the remote control 25 once again while displaying the message 38 of "remote control mode" as illustrated in FIG. 5A. In this manner as well, it is possible to indicate to a user whether the pointer operating device 34 is connected.

Figure 6A:
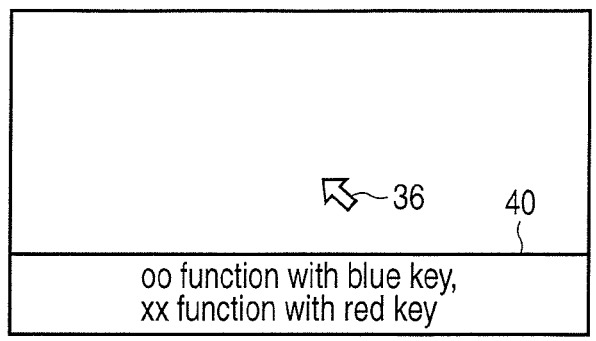
FIGS. 6A and 6B are explanatory views respectively of an example of presence and absence of displaying help information on a screen of the digital television broadcast receiver according to the embodiment.

Further, in a state that the pointer is displayed while being in a non-connected state of the pointer operating device 34, that is, while being in the pointer operating state with the remote control 25, the control module 23 causes the screen of the image display module 21 to display help information 40 regarding key operation of the remote control 25 along with the pointer 36, as illustrated in FIG. 6A.

Specifically, the help information 40 includes a guide message and the like to notify a user of currently operable keys for receiving operation and functions and the like of the keys among the various keys of the remote control 25. Examples include a guide message for a user such that oo function is performed when the blue color key 25m is operated and xx function is performed when the red color key 25m is operated.

Figure 6B:
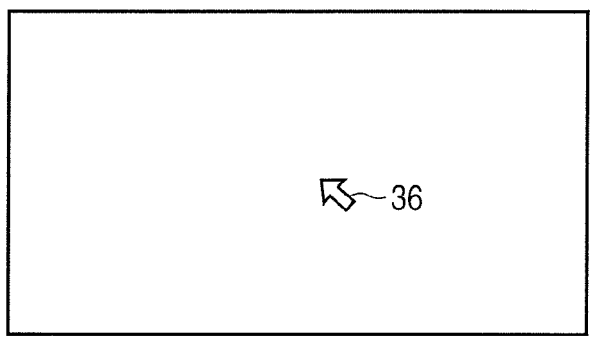

In the above state, when the pointer operating device 34 is connected to the connecting module 33 to be switched into the pointer operating state with the pointer operating device 34, the control module 23 automatically discontinues display of the help information 40 as illustrated in FIG. 6B. That is, since the help information 40 regarding operation of the remote control 25 becomes unnecessary information in the pointer operating state with the pointer operating device 34, operation for a user is to be convenient while preventing user's confusion without displaying the help information 40.

Here, when the pointer operating device 34 is detached from the connecting module 33, the control module 23 automatically displays the help information 40 regarding key operation of the remote control 25 on the screen once again as illustrated in FIG. 6A.

Further, it is possible to display help information regarding key operation of the remote control 25 being receivable even in the pointer operating state with the pointer operating device 34 and help information and the like regarding key operation of the remote control 25 required in the pointer operating state with the pointer operating device 34.

Further, when switched into the pointer operating state with the pointer operating device 34, it is also possible to change the help information regarding key operation of the remote control 25 to help information regarding operation of the pointer operating device 34, such as specific help information in which a predetermined menu screen is displayed when right click key 35c is operated.

Further, as described above, in the pointer operating state with the remote control 25, the pointer 36 can be moved in each of upward, downward, leftward and rightward directions by selectively operating each of the upward, downward, leftward and rightward moving keys 25e to 25h of the remote control 25.

Figure 7A:
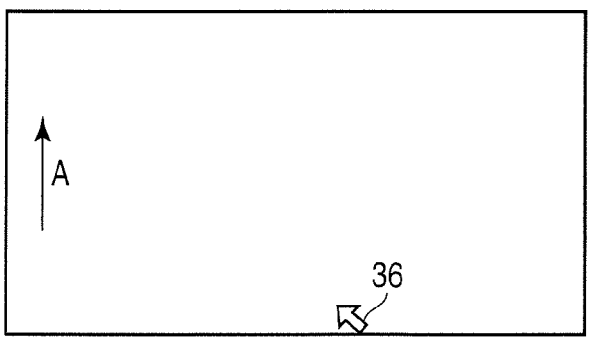
FIGS. 7A and 7B are explanatory views respectively of an example of an automatic scrolling function in the vertical direction of a screen performed by the digital television broadcast receiver according to the embodiment.

In this case, when the pointer 36 is moved to the lowermost end of the screen as illustrated in FIG. 7A by operating the downward moving key 25f and the downward moving key 25f is further continued to be operated in the above state, for example, the control module 23 controls to perform so-called upward automatic scrolling, that is, to move display contents on the screen from the lower part to the upper part of the screen as indicated by arrow A.

Figure 7B:
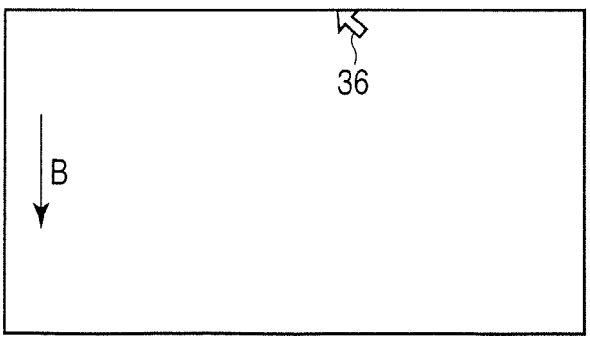

Similarly, when the pointer 36 is moved to the uppermost end of the screen as illustrated in FIG. 7B by operating the upward moving key 25e and the upward moving key 25e is further continued to be operated in the above state, the control module 23 controls to perform so-called downward automatic scrolling, that is, to move display contents on the screen from the upper part to the lower part of the screen as indicated by arrow B.

On the other hand, in the pointer operating state with the pointer operating device 34, especially with the mouse 35, the control module 23 performs the upward scrolling or the downward scrolling (i.e., the scrolling in the vertical direction) regardless of a position of the pointer 36 within the screen by receiving rotational operation of the dial key 35d.

In this case, if the automatic scrolling in the upward direction or the downward direction is performed by moving the pointer 36 to the lowermost end or the uppermost end of the screen as illustrated FIG. 7A or FIG. 7B with the operation of the mouse 35 as well, the scrolling in the vertical direction of the screen is to be performed by both the rotational operation of the dial key 35d and the movement operation of the pointer 36. With the above, there is a possibility that scrolling in an unintentional direction for a user is performed to cause inconvenient operation.

Accordingly, in the pointer operating state with the mouse 35, the control module 23 controls to perform the scrolling in the vertical direction of the screen by the rotational operation of the dial key 35d while invalidating the function of the automatic scrolling in the vertical direction of the screen by the movement of the pointer 36 to the lowermost end or the uppermost end, that is, controls not to perform the automatic scrolling. In this manner, operation for a user is to be convenient.

Further, when the pointer 36 is moved to the leftmost end of the screen as illustrated in FIG. 8A by operating the leftward moving key 25g of the remote control 25 and the leftward moving key 25g is further continued to be operated in the above state, for example, the control module 23 controls to perform so-called rightward automatic scrolling, that is, to move display contents on the screen from the left to the right of the screen as indicated by arrow C.

Similarly, when the pointer 36 is moved to the rightmost end of the screen as illustrated in FIG. 8B by operating the rightward moving key 25h and the rightward moving key 25h is further continued to be operated in the above state, the control module 23 controls to perform so-called leftward automatic scrolling, that is, to move display contents on the screen from the right to the left as indicated by arrow D.

By the way, the mouse 35 is not provided with a dial key to perform the rightward scrolling or the leftward scrolling, that is, the scrolling in the horizontal direction of the screen. Accordingly, for performing the scrolling in the horizontal direction of the screen in the pointer operating state with the mouse 35, the control module 23 utilizes a function of the automatic scrolling in the horizontal direction of the screen which is performed by movement of the pointer 36 to the leftmost end or the rightmost end due to operation of the mouse 35.

Here, in the above embodiment, the mouse 35 has been described as an example of the pointer operating device 34. However, not limited to the mouse 35, a touch pad, a joy stick and the like can be used for the pointer operating device 34. Further, it is also possible to utilize a portable terminal. That is, it is also possible to perform pointer operation by connecting a portable terminal provided with a touch panel to the control module 23 so as to be wirelessly communicable and transmitting operational information to the control module 23 while operating a screen of the touch panel like a touch pad.

As described above, various types can be adopted as the pointer operating device 34. Then, operational feeling, operable functions and the like are different depending on the device to be used. Accordingly, when the pointer operating device 34 is connected, the connecting module 33 to which the pointer operating device 34 is connected notifies the control module 23 of setting information indicating what types of functions are to be performed in accordance with types of the connected pointer operating device 34 as well as informing the control module 23 whether the pointer operating device 34 is connected.

FIG. 9 is a table organizing setting information for each function for two types of pointer operating devices 34, i.e., the mouse 35 and a touch pad. That is, the automatic scrolling function in the vertical direction of the screen is invalidated with the mouse 35 as described above and is validated with the touch pad. Further, the automatic scrolling function in the horizontal direction of the screen is validated with both of the mouse 35 and the touch pad. Further, the screen for character input is to be a soft keyboard with both of the mouse 35 and the touch pad.

Accordingly, when the mouse 35 is connected, for example, the connecting module 33 refers to the above table and obtains setting information to invalidate the automatic scrolling function in the vertical direction of the screen, to validate the automatic scrolling function in the horizontal direction of the screen, and to set the character inputting screen as a soft keyboard. Then, the connecting module 33 notifies the control module 23 of the setting information along with the information indicating the connection. Accordingly, the control module 23 is capable of determining control details based on the setting information notified from the connecting module 33 and performing the function corresponding to the type of the pointer operating device 34. In this manner, it is possible to afford convenience of the operation to a user.

Further, when performing information search by utilizing the network 31, the control module 23 adopts text input for specifying search conditions. A soft keyboard, a multi-tap or the like is used for such text input. Here, performing text input by operating the remote control 25 is a very complicated operation for a user.

On the other hand, since text information in a content displayed on the screen can be copied with the pointer operating device 34 such as the mouse 35, for example, it becomes possible to utilize the copied text information as the search conditions.

That is, in the case of inputting a character string, the control module 23 controls to display an initial screen to be a screen for performing text input by operating the remote control 25 in the non-connected state of the pointer operating device 34. Then, when connection of the pointer operating device 34 is detected, the control module 23 controls to display the initial screen to be a screen with listed keywords having high possibility to be input as input character candidates.

It becomes possible for a user to easily input a character string by selecting and determining a desired keyword out of the list. For example, in the case of utilizing the pointer operating device 34 such as the mouse 35, a desired keyword can be input with easy operation by moving the pointer 36 to a displaying area of the keyword out of plural keywords displayed on the screen and operating the left click key 35b.

Further, it is obvious that the character string input may be performed by a user copying a desired keyword out of the list.

Here, the keywords in the list are set to include text information which was selected by operation of the pointer operating device 34 in the past. Alternatively, it is also possible to utilize information of nouns extracted from the content which is currently displayed.

Further, it is also possible to prepare plural connecting modules 33 and to connect different types of pointer operating devices 34 respectively to the connecting modules 33. In this case, the control module 23 controls to display a menu screen for selecting and determining which type of pointer operating device 34 is to be used based on operation of the operation module 24, the remote control 25 and the like by a user. Accordingly, the user can perform pointer operation with the pointer operating device 34 selected from the menu screen.

Here, in the above embodiment, the pointer operating device 34 has been described as being detachably connected to the connecting module 33. However, not limited to this, it is obvious that the various types of pointer operation functions which have been described above can be performed even when the pointer operating device 34 and the connecting module 33 are wirelessly connected as being capable of communicating operational information.

Figure 10:
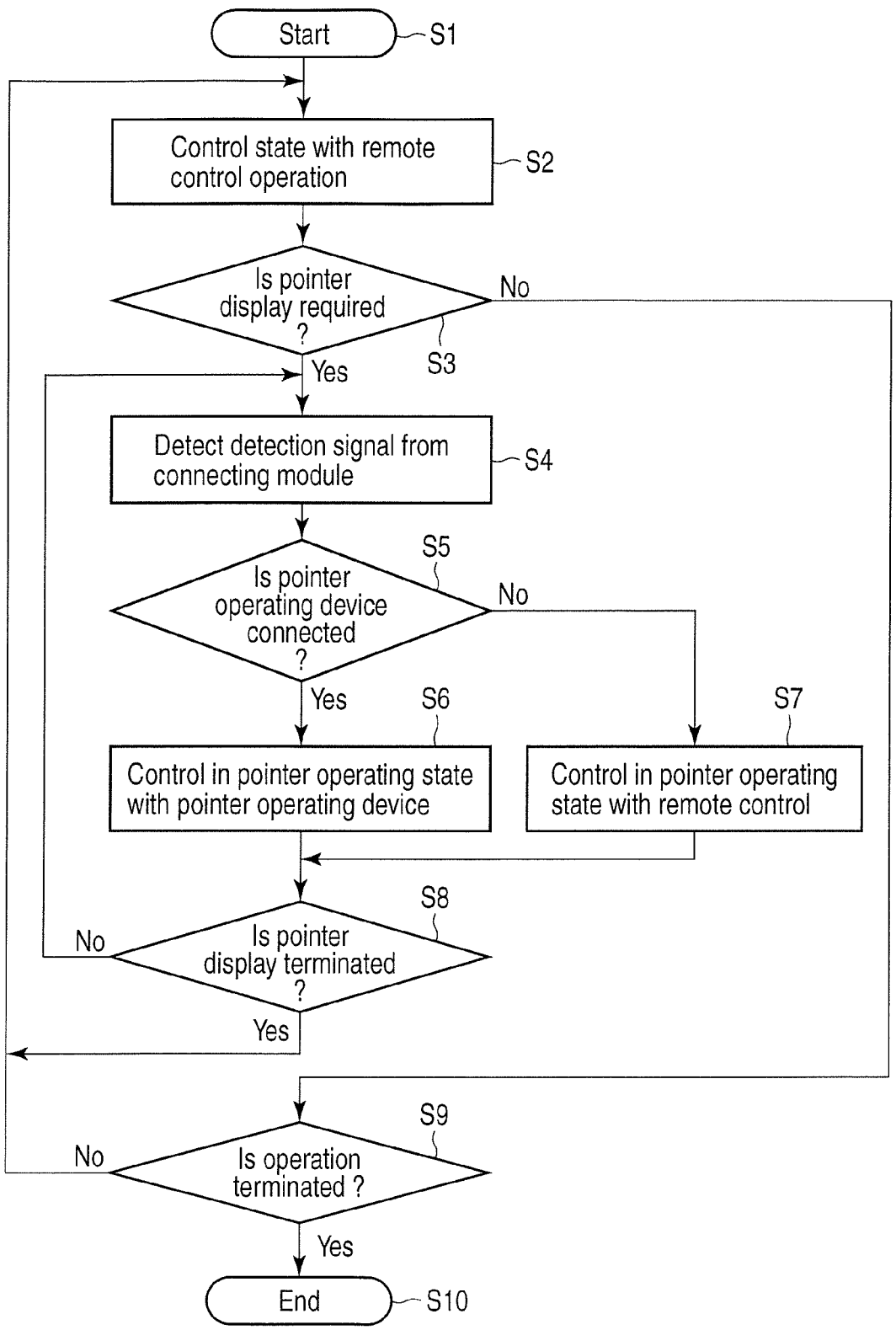
FIG. 10 is an explanatory flowchart of an example of main processing operation performed by the digital television broadcast receiver according to the embodiment.

FIG. 10 is a flowchart organizing main processing operation to be performed by the control module 23. That is, when the processing is started (step S1), the control module 23 is in a state of receiving operational information from the operation module 24, the remote control 25 or the like by a user and controlling each module to reflect the operational information in step S2.

In such a state, the control module 23 determines whether or not nature of current operation requires pointer display in step S3. Here, when it is determined that the nature does not require the pointer display ("No"), the control module 23 determines whether or not termination of operation on the digital television broadcast receiver 11 is notified from a user in step S9.

This determination is performed by determining whether or not the power key 25a of the remote control 25 is operated to be in a power-off state, for example. The control module 23 is returned to the process of step S2 when it is determined that termination of operation is not notified ("No"), while the processing is ended (step S10) when it is determined that termination of operation is notified ("Yes").

Further, when it is determined that the pointer display is required in step S3 ("Yes"), the control module 23 detects a signal to indicate whether the pointer operating device 34 is connected, the signal being supplied from the connecting module 33 in step S4, and then, determines whether or not the pointer operating device 34 is connected to the connecting module 33 in step S5.

Here, when it is determined that the pointer operating device 34 is connected ("Yes"), the control module 23 is controlled in the pointer operating state based on operation of the connected pointer operating device 34 in step S6. When it is determined that the pointer operating device 34 is not connected ("No") in step S5, the control module 23 is controlled in the pointer operating state based on operation of the remote control 25 in step S7.

Then, subsequently to step S6 or step S7, the control module 23 determines whether or not the state requiring the pointer display is terminated in step S8. It is returned to the process of step S4 when it is determined as being not terminated ("No"), while being returned to the process of step S2 when it is determined as being terminated ("Yes").

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus configured to be controlled to be in a state corresponding to control information received from a first controller, the apparatus comprising:
   a connector configured to be capable of being connected with a second controller;
   a display controller configured to display, in response to connection of the second controller to the connector, a first message regarding that the second controller is in a connected state during a time period of the connection, and
   a controller configured to control a pointer to be in a state controllable by the first controller in response to disconnection of the second controller to the connector, and control a pointer to be in a state controllable by the second controller in response to connection of the second controller to the connector,
   wherein the display controller is configured to display, in response to connection of the second controller to the connector, the first message regarding that a pointer is controllable by the second controller, and display, in response to disconnection of the second controller from the connector, a second message regarding that a pointer is controllable by the first controller.

2. The apparatus of claim 1, wherein
the display controller is configured not to display help information for operation of the first controller while the second controller is connected.

3. The apparatus of claim 1, further comprising:
a controller configured to invalidate an automatic scrolling function while the second controller is connected.

4. The apparatus of claim 1, further comprising:
a controller configured to display a list of candidates of input characters when a character input screen is displayed while the second controller is connected.

5. The apparatus of claim 1, wherein the display controller is configured not to display a pointer in response to image output of program.

6. The apparatus of claim 5, wherein the display controller is configured to display a pointer in response to activation of browser.

7. An information processing apparatus configured to be controlled to be in a state corresponding to control information received from a first controller, the apparatus comprising:
a connector configured to be capable of being connected with a second controller; and
a display controller configured to display, in response to connection of the second controller to the connector, a first message regarding that the second controller is in a connected state during a time period of the connection,
wherein the display controller is configured to (i) display, in response to connection of the second controller to the connector, a pointer controlled by the second controller in a first display form during the time period of the connection, and (ii) display, in response to disconnection of the second controller to the connector, a pointer controlled by the first controller in a second display form during the time period of the disconnection.

8. A method of controlling an information processing apparatus configured to be controlled to be in a state corresponding to control information received from a first controller, the method comprising:
displaying, in response to connection of a second controller to a connector of the information processing apparatus, a first message regarding that the second controller is in a connected state during a time period of the connection;
displaying, in response to connection of the second controller to the connector, the first message regarding that a pointer is controllable by the second controller;
displaying, in response to disconnection of the second controller to the connector, a second message regarding that a pointer is controllable by the first controller during the time period of the disconnection; and
controlling a pointer to be in a state controllable by the first controller in response to disconnection of the second controller to the connector, and controlling a pointer to be in a state controllable by the second controller in response to connection of the second controller to the connector.

9. The method of claim 8, further comprising: not displaying a pointer in response to image output of program.

10. The method of claim 9, further comprising:
displaying a pointer in response to activation of browser.

11. A method of controlling an information processing apparatus configured to be controlled to be in a state corresponding to control information received from a first controller, the method comprising:
displaying, in response to connection of a second controller to a connector of the information processing apparatus, a first message regarding that the second controller is in a connected state during a time period of the connection;
displaying, in response to connection of the second controller to the connector, a pointer controlled by the second controller in a first display form during the time period of the connection: and
displaying, in response to disconnection of the second controller to the connector, a pointer controlled by the first controller in a second display form during the time period of the disconnection.

12. A non-transitory computer readable medium having stored thereon a computer program which is executable by a computer, the computer program controlling the computer to execute functions of:
displaying, in response to connection of a second controller to a connector of an information processing apparatus configured to be controlled to be in a state corresponding to control information received from a first controller, a first message regarding that the second controller is in a connected state during a time period of the connection;
displaying, in response to connection of the second controller to the connector, the first message regarding that a pointer is controllable by the second controller;
displaying, in response to disconnection of the second controller to the connector, a second message regarding that a pointer is controllable by the first controller during the time period of the disconnection; and
controlling a pointer to be in a state controllable by the first controller in response to disconnection of the second controller to the connector, and controlling a pointer to be in a state controllable by the second controller in response to connection of the second controller to the connector.

13. The non-transitory computer readable medium of claim 12, wherein the computer program controls the computer to execute functions of:
not displaying a pointer in response to image output of program.

14. The non-transitory computer readable medium of claim 13, wherein the computer program controls the computer to execute functions of:
displaying a pointer in response to activation of browser.

15. A non-transitory computer readable medium having stored thereon a computer program which is executable by a computer, the computer program controls the computer to execute functions of:
displaying, in response to connection of a second controller to a connector of an information processing apparatus configured to be controlled to be in a state corresponding to control information received from a first controller, a first message regarding that the second controller is in a connected state during a time period of the connection;
displaying, in response to connection of the second controller to the connector, a pointer controlled by the second controller in a first display form during the time period of the connection: and
displaying, in response to disconnection of the second controller to the connector, a pointer controlled by the first controller in a second display form during the time period of the disconnection.

* * * * *